C. W. BIRCHWOOD.
METHOD OF MAKING COUPLINGS.
APPLICATION FILED DEC. 26, 1911.
1,050,422.
Patented Jan. 14, 1913.
2 SHEETS—SHEET 1.
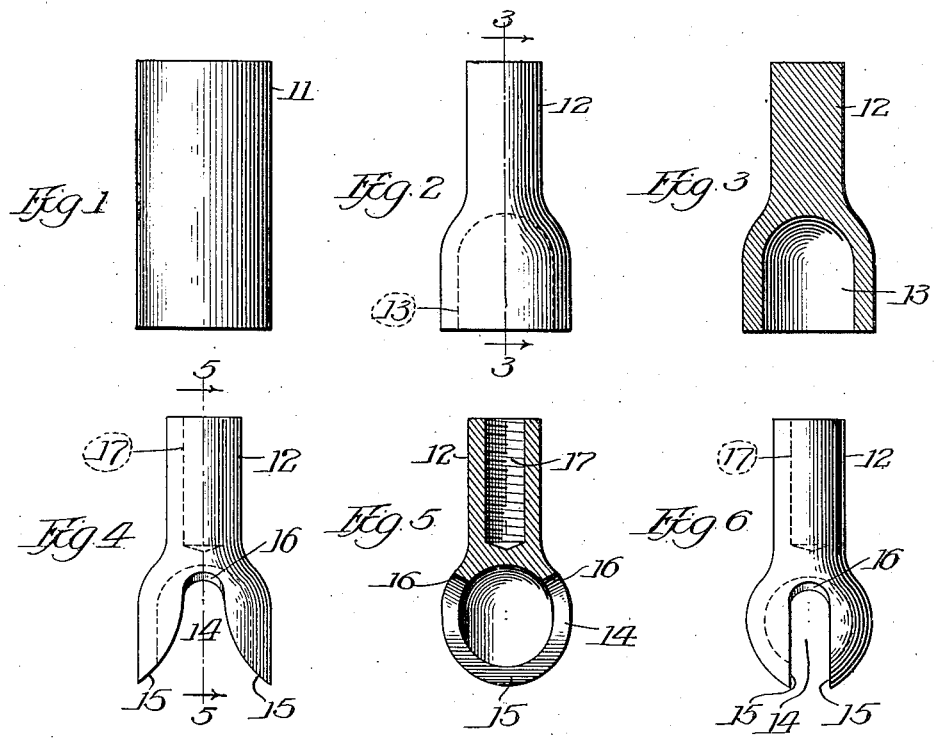
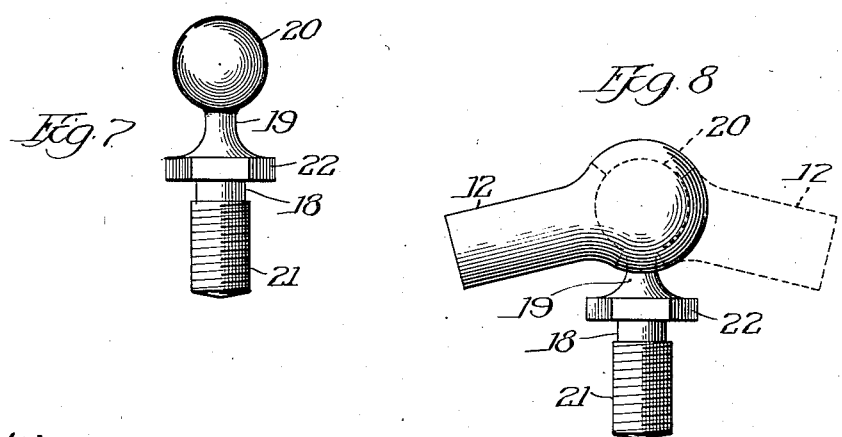
Witnesses:
Ted C. Davison
Ira J. Wilson
Inventor:
Charles W. Birchwood
By Luthicum Belt & Fuller
Attys C. W. BIRCHWOOD.
METHOD OF MAKING COUPLINGS.
APPLICATION FILED DEC. 26, 1911.
1,050,422.
Patented Jan. 14, 1913.
2 SHEETS—SHEET 2.
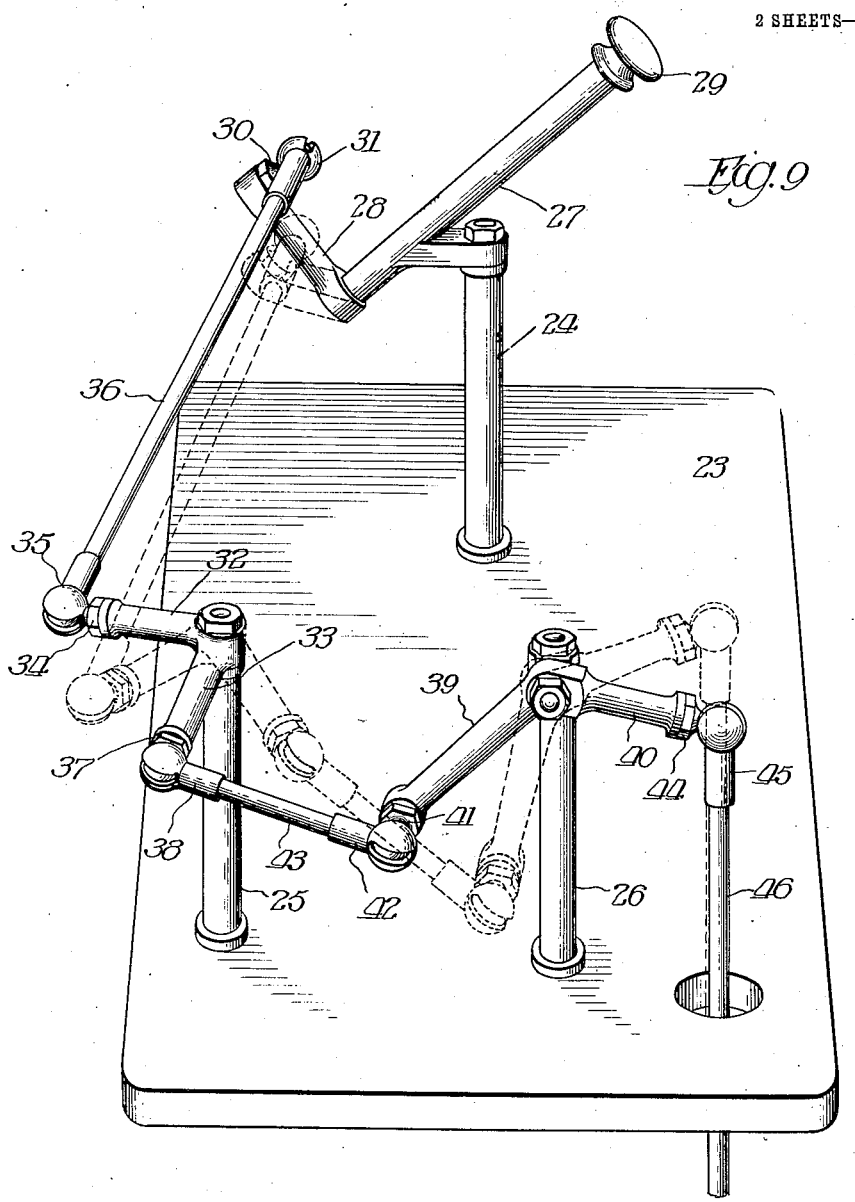
Witnesses:
Inventor:
Charles W. Birchwood
By Linthicum Belt & Fuller
Attys.

UNITED STATES PATENT OFFICE.

CHARLES W. BIRCHWOOD, OF CHICAGO, ILLINOIS.

METHOD OF MAKING COUPLINGS.

1,050,422.　　　　　Specification of Letters Patent.　　Patented Jan. 14, 1913.

Application filed December 26, 1911. Serial No. 667,711.

*To all whom it may concern:*

Be it known that I, CHARLES W. BIRCHWOOD, a subject of the King of Great Britain, residing at Chicago, in the county of Cook and State of Illinois, have invented certain new and useful Improvements in Methods of Making Couplings, of which the following is a specification.

This invention relates to the method of making couplings for connecting movable rods, levers and other mechanical elements and particularly to those adapted for use in automobile construction for connecting various movable parts such, for instance, as the throttle with its operating handle or lever, etc.

One of the objects of the invention is the provision of a novel and improved method of making a coupling which will permit of a maximum amount of movement between the members thereof while at the same time eliminating all lost motion between the parts, which method enables the coupling to be produced with a minimum amount of labor and at a minimum cost, and which provides a coupling each member of which is of integral construction, thereby affording maximum strength and durability.

Other objects and many of the attendant advantages of the present invention will be manifest as the invention is better understood by reference to the following description when considered in connection with the accompanying drawings.

Referring to the drawings—Figure 1 is a side elevational view of a piece of metal stock from which the socket member of the coupling is formed; Fig. 2 shows the stock after it has been turned down to form the shank of the socket member and the hole has been drilled in the larger end; Fig. 3 is a sectional view on the line 3—3 of Fig. 2; Fig. 4 is an elevational view of the socket member after the slots have been milled in the walls of the socket end of the member; Fig. 5 is a sectional view on the line 5—5 of Fig. 4; Fig. 6 shows the walls of the socket member compressed to form the ball receiving socket; Fig. 7 is a detail view of the ball member; Fig. 8 is an elevational view of the complete coupling showing in full and dotted lines the extreme positions of the ball and socket members; and Fig. 9 is a perspective view of a system of levers and links showing various applications of the coupling.

In carrying out my novel method which results in the production of an improved and highly efficient coupling, a piece of blank stock 11 of any suitable metal, preferably steel, is turned to the form shown in Fig. 2 to produce the reduced shank portion 12. A hole or cavity 13 is then drilled in the larger or socket end of the stock to the required depth, the bottom of the hole being preferably rounded to form a bearing surface for the ball at the bottom of the completed socket as shown in Fig. 3. The walls of the hole 13 are next provided with a transversely extending slot 14, the axis of said slot lying in the plane of the longitudinal axis of the hole. The side walls of said slot are flared or curved outwardly as indicated at 15, the outer ends of the slot intersecting the walls of the hole 13 so that the outer edges of said walls at the mouth of the hole are tapered, as shown in Fig. 4. The slot may be formed in any preferred manner but one practical and economical way is by the use of a milling machine having a cutter shaped to correspond to the shape of the slot to be produced and the slot extending through opposite sides of the hole in the socket member may obviously be cut by the milling tool at a single operation. After the slot has been cut to the required depth the stock or the tool is preferably changed to taper or incline the lower ends of the slot as shown at 16 to permit a maximum relative movement between the ball and the socket members without destroying or impairing the bearing surface of the bottom of the socket. The shank 12, either before or after the formation of the slot 14, is drilled and tapped to provide the internally threaded bore 17 adapted for connection with the threaded end of a connecting rod or other member with which the coupling is to be employed.

The ball member shown in Fig. 7 may be constructed in any desired manner but is preferably turned from a single piece of metal stock to form the shank 18 having the contracted neck 19 at the end of which is formed the ball 20. The outer end of the shank is preferably threaded as indicated at 21 for connection with the arm of a lever or the threaded bore of a connecting rod and the head 22 may be square or hexagonal in form to accommodate a wrench by means of which the member may be held or turned in threading the end 21 into the member with which it is to be connected.

In assembling my coupling a ball member is inserted into the slotted socket end of the socket member, shown in Fig. 4, whereupon the extremities of the socket walls on each side of the slot 14 are compressed about the ball 20 into the position shown in Fig. 6; the ball member, however, being omitted from this figure. This compression of the socket walls about the ball may be readily accomplished in a press of ordinary construction and, when the ends are brought together or toward each other into the position shown in Fig. 6, the inclined outer edges 15 are brought into alinement with the straight or bottom edges of the slot 14 thereby producing an elongated slot of substantially uniform width having parallel walls adapted to accommodate the neck 19 of the shank 18 and extending through an arc considerably greater than 180°. It will be evident that the length of the slot in the completed socket is dependent upon the depth of the original slot 14 and, since in actual practice this slot is usually cut nearly to the bottom of the hole 13, as shown in Fig. 4, a slot of maximum length is produced permitting a maximum relative movement between the ball and socket members of the coupling; this movement being further augmented by the tapered or inclined bottoms 16 of the slot. The slot 14 lies in the plane of the longitudinal axis of the socket member and when the ball and socket members are assembled it will be manifest that the axes of both members lie in a common plane so that a straight connection between two coaxially mounted rods can be effected, if desired. In Fig. 8 are shown the two extreme positions of the socket member relatively to the ball member. It will be evident that connections can be established by means of this coupling between members disposed at any angle relatively to each other between the two extreme positions shown in this figure.

On Fig. 9 is shown a system of levers and links connected by a coupling made in pursuance of my invention to illustrate several of the many ways of connecting various elements by means of the same. Upon the block 23 I have mounted the upright posts 24, 25 and 26, respectively. An elongated bearing 27 is fixed to the upper end of the post 24 and within the bearing is mounted a shaft provided with a radial arm 28 at one end and an operating button or handle 29 at its opposite end. A ball member 30 is mounted on the side of the arm 28 and is connected with the socket member 31 in the manner previously described. Upon the post 25 is pivotally mounted a bell-crank lever comprising the arm 32 and the arm 33 mounted to move in a horizontal plane. The ball member 34 is threaded into the end of the arm 32, the socket member 35 being connected therewith in the usual manner. A link 36 connects the socket members 31 and 35 as shown. The arm 33 is also provided with a longitudinally extending ball member 37 connected with the socket member 38. Upon the post 26 is mounted the bell-crank lever comprising the arms 39 and 40 mounted to move in a vertical plane, the arm 39 being provided with a laterally extending ball member 41 and its companion socket member 42, the socket members 38 and 42 being connected by the link 43. A longitudinally extending ball member 44 projects from the end of the arm 40 and its socket member 45 has connected therewith a link or rod 46 as shown. One position of the various elements illustrated in this figure is shown by full lines and another position by dotted lines. The connection between the arms 28 and 32 illustrate how connections can be effected with the ball members projecting laterally from the socket members and, it will be obvious that as the arm 28 is moved from full to dotted line position, the socket member 31 will move about the ball member 30 in a plane substantially at right angles to the longitudinal axis of the ball member while the socket 35 will move about the ball member 34 in a plane substantially parallel with the longitudinal axis of the ball member 34. The connection between the arms 33 and 39 shown in full and dotted line position illustrate how two arms, one moving in a horizontal plane and the other in a vertical plane, can be connected by means of this coupling. From the dotted line position of the link 43 it will be seen that one end of the link 43 has moved downwardly while the opposite end has simultaneously moved horizontally. This movement is a very common one in automobile construction and this coupling is particularly adapted for connecting elements moving in this manner since a connection can be established which will permit absolute freedom of movement of the parts without involving any lost motion between them.

Heretofore a connection between members moving in different planes has been established by the use of a double universal joint at each end of the connecting link but lost motion cannot be obviated in a universal joint and, furthermore, the durability and efficiency of such a joint is much inferior to the hereinbefore described form of ball and socket coupling.

It will be apparent that I have produced a ball and socket coupling comprising merely two members, an integral ball member consisting of a ball and a shank and an integral socket member consisting of a socket and a shank. The socket is preferably tempered, after the parts have been assembled, to relieve the walls thereof of the tension and compression under which they are placed by compressing the socket walls about the ball and also to strengthen the walls of the socket member so that all liability of separation of the ball and socket members under tension is obviated. It will be evident that when the ball member is fixedly mounted the socket member is capable of a great range of movement about the ball member either, in planes coincident with the longitudinal axis of the ball member or, in a number of different planes intersecting said axis. The socket fits snugly around the ball thereby eliminating all lost motion so that the coupling is particularly adapted for uses where transmission of motion without loss is required.

While I have shown and described an improved method for making a coupling of the form hereinbefore described, it will be understood that the said method may be applied with equal efficiency to the manufacture of couplings differing in various mechanical details, and that numerous minor changes in the method may be resorted to without departing from the spirit or scope of the invention or sacrificing any of the material advantages thereof.

I claim:

1. The method of making a coupling, consisting in forming a depression in a piece of metal stock, slotting the walls of said depression in the plane of the longitudinal axis of the depression, inserting a ball in said depression, and compressing the walls of the depression around the ball to form a socket in which said ball is disposed.

2. The method of making a coupling, consisting in forming a cavity in the end of a piece of metal stock, forming tapered slots in the walls of said cavity, and forcing the outer ends of said walls together around a ball to form a socket in which said ball is disposed.

3. The method of making a socket member for a coupling, consisting in forming a hole in a piece of stock, and removing portions of the walls of said hole to form a plurality of oppositely disposed slots wider at the mouth of the hole than at the bottom thereof.

4. The method of making a socket member for a coupling, consisting in drilling a hole in a piece of metal stock, and milling slots in the opposite walls of said hole and in the plane of the longitudinal axis of said hole, said slots being widened at their outer ends to produce a flaring mouth for said hole.

5. The method of making a coupling, consisting in drilling a hole in the end of a piece of metal stock, providing slots in the walls of said hole, the upper ends of said slots being curved outwardly to intersect the uncut portions of said walls, inserting a ball provided with a shank in said hole and pressing the free edges of the walls of said hole together to form a socket embracing said ball, and having an elongated slot of substantially uniform width to accommodate the ball shank.

6. The method of making a coupling, consisting in turning a piece of stock to form a shank with the ball on one end thereof, boring a depression in the end of another piece of stock, milling a slot wider at its mouth than at its bottom in the walls of said depression, inserting the ball in the depression, and compressing the walls of the depression on each side of the slot around the ball to produce a socket for the ball having a slot greater than 180° in length and of substantially uniform width through which said shank projects.

CHARLES W. BIRCHWOOD.

Witnesses:
   Wm. O. Belt,
   M. A. Kiddie.